United States Patent [19]

Jordan

[11] Patent Number: 5,486,074
[45] Date of Patent: Jan. 23, 1996

[54] PORTABLE DRILLING APPARATUS

[76] Inventor: John M. Jordan, 104A Overlook Pass, Clifton Park, N.Y. 12065

[21] Appl. No.: 306,393

[22] Filed: Sep. 15, 1994

[51] Int. Cl.$^6$ .............................. B23B 45/14; B23B 41/00
[52] U.S. Cl. ................ 408/77; 408/88; 408/103
[58] Field of Search .................. 408/61, 77, 78, 408/88, 112, 103, 115 R, 234, 53

[56] References Cited

U.S. PATENT DOCUMENTS

| | | | |
|---|---|---|---|
| 530,979 | 12/1894 | Williams | 408/88 |
| 1,728,367 | 9/1929 | Sapp | 408/77 |
| 2,871,730 | 2/1959 | Gremp | 408/77 |
| 2,988,934 | 6/1961 | Shlager | 408/77 |
| 3,507,025 | 4/1970 | Ankeney | 408/61 |
| 4,108,566 | 8/1978 | Jones | 408/88 |
| 4,765,785 | 8/1988 | Calzone | 408/77 |

FOREIGN PATENT DOCUMENTS

| | | | |
|---|---|---|---|
| 536033 | 4/1922 | France | 408/77 |
| 2342002 | 2/1975 | Germany | 408/77 |

*Primary Examiner*—Daniel W. Howell

[57] ABSTRACT

This invention relates to a portable apparatus designed to facilitate the task of locating and drilling of the holes specified on shop drawings for metal plates, structural shapes and non-round tubes. It can be equipped with one or more powered drilling tools. Equipped with two such tools, the apparatus will weigh less than 60 pounds. It can drill one hole at a time or two holes simultaneously; and it is not limited by the length, width, or weight of the workpiece.

6 Claims, 5 Drawing Sheets

PORTABLE DRILLING APPARATUS

BACKGROUND

Presently, there are just two methods generally used in the art of locating and making holes in structural shapes, plates and non-round tubes. First there are stationary machines available that can locate and drill holes, and others that can locate and punch holes in structural shapes, but are not practical for use on plates or non-round tubes, most of these machines are equipped with numerical controls and electronic measuring devices. In comparison to my invention, these machines are expensive, massive, require foundations, conveyors, special holding devices, and frequent maintenance. The second method is the age-old practice of using hand held measuring tapes, squares and chalk lines to locate by laying out in two directions every hole specified. These locations must then be center punched, and in some cases, both a center punch mark and a pilot hole are necessary before the desired final hole diameter can be drilled or punched. This method requires the employment of highly skilled mechanics and limits the drilling or punching of just one hole at a time. My invention has the ability to drill two holes simultaneously.

In comparison to the first method, my invention is very inexpensive and requires very little maintenance. It allows for drilling in the shop or field and other than using common dunnage material and shop sawhorses, no special holding devices are necessary.

My invention is a great deal faster and more accurate than the second method and does not require highly skilled mechanics to operate it. In many situations, it can make a considerable savings in material handling.

The following disclosures may be relevant to various aspects of the present invention:

U.S. Pat. No. 3,391,593 Inventor: Jordan Issue Date: Jul. 9, 1968

U.S. Pat. No. 3,981,605 Inventor: Wirsing Issue Date: Sep. 21, 1976

U.S. Pat. No. 4,198,181 Inventor: Smelser Issue Date: Apr. 15, 1980

U.S. Pat. No. 4,753,556 Inventor: Solko Issue Date: Jun. 28, 1988

The relevant portions of the foregoing disclosures may be briefly summarized as follows:

U.S. Pat. No. 3,391,593 describes an apparatus for punching holes in structural shapes. The apparatus has a conveyor of rolls to longitudinally position the shape and the punch is laterally movable on a second set of rollers to accurately position the punch.

U.S. Pat. No. 3,981,605 discloses a tool carrying carriage for movement in both the X and Y axes. There is provided precision ball bearings on precision shafts with cam followers on guide bars to carry the load and minimize deflection of the shafts.

U.S. Pat. No. 4,198,181 describes an apparatus for drilling holes in the web and flange of an H-beam on opposite sides of the web. There is a framework having a first fixedly mounted section and a second vertically movable second section. Vertical and horizontal drills are mounted on the second section of the framework.

U.S. Pat. No. 4,753,556 discloses an apparatus for positioning and clamping a power tool such as a drill onto a workpiece such as a railroad rail.

DESCRIPTION

This invention is made up of two metal frames (FIG. 5), one positioned horizontally, and the other in the vertical.

Other features of the present invention will become apparent as the following description proceeds and upon reference to the drawings in which.

Figure 3:
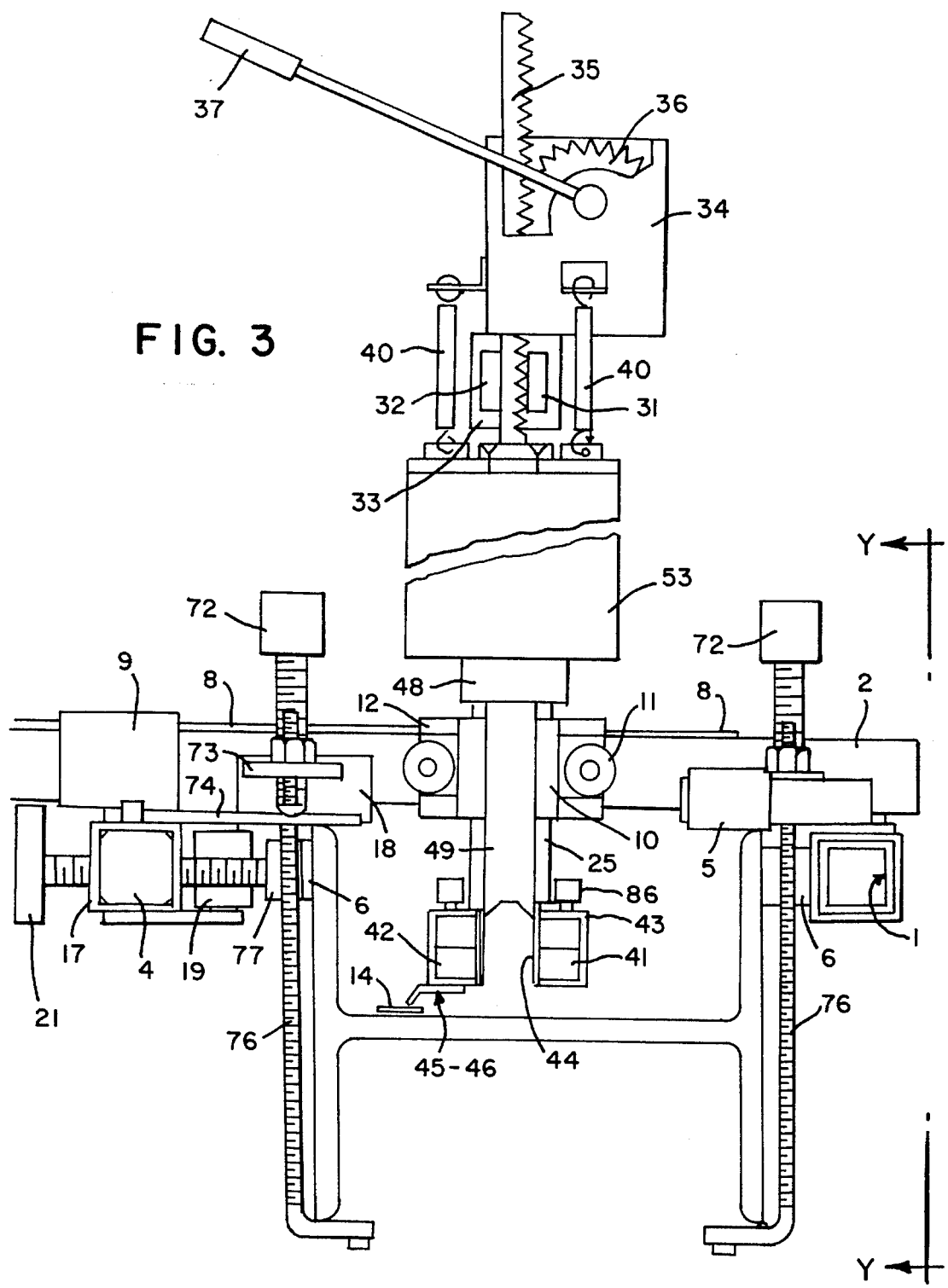
FIG. 3 is a right side elevation taken through Section B—B of FIG. 2.
Figure 4:
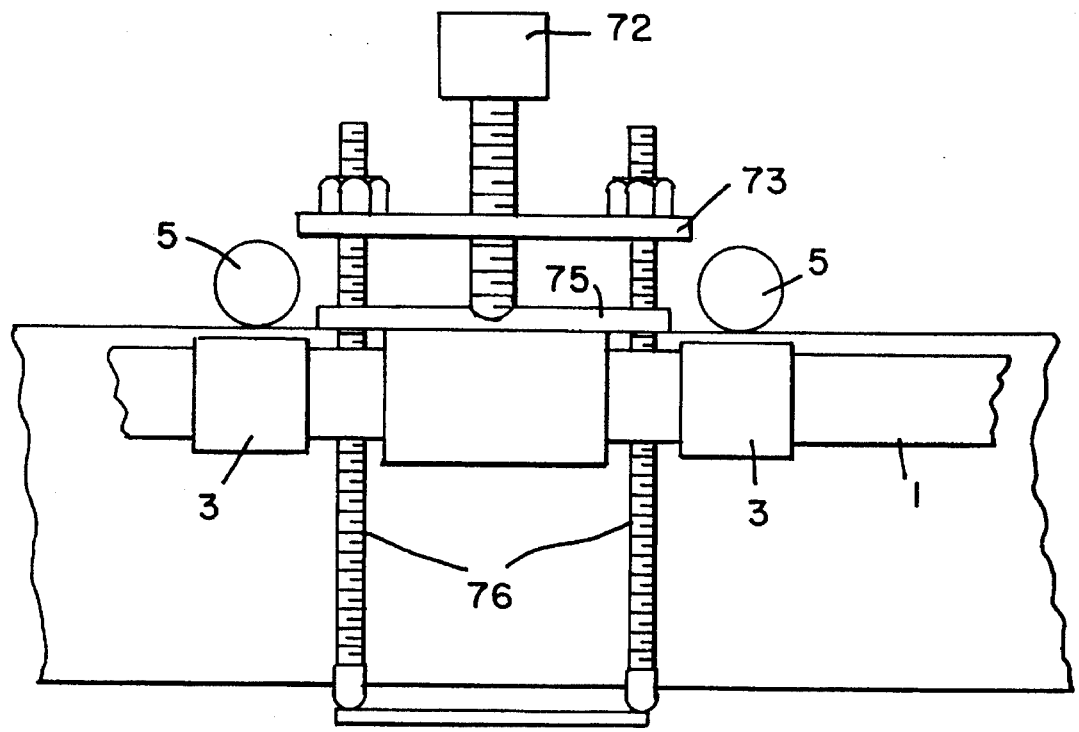
FIG. 4 is an elevation at section Y—Y on FIG. 3.
Figure 5:
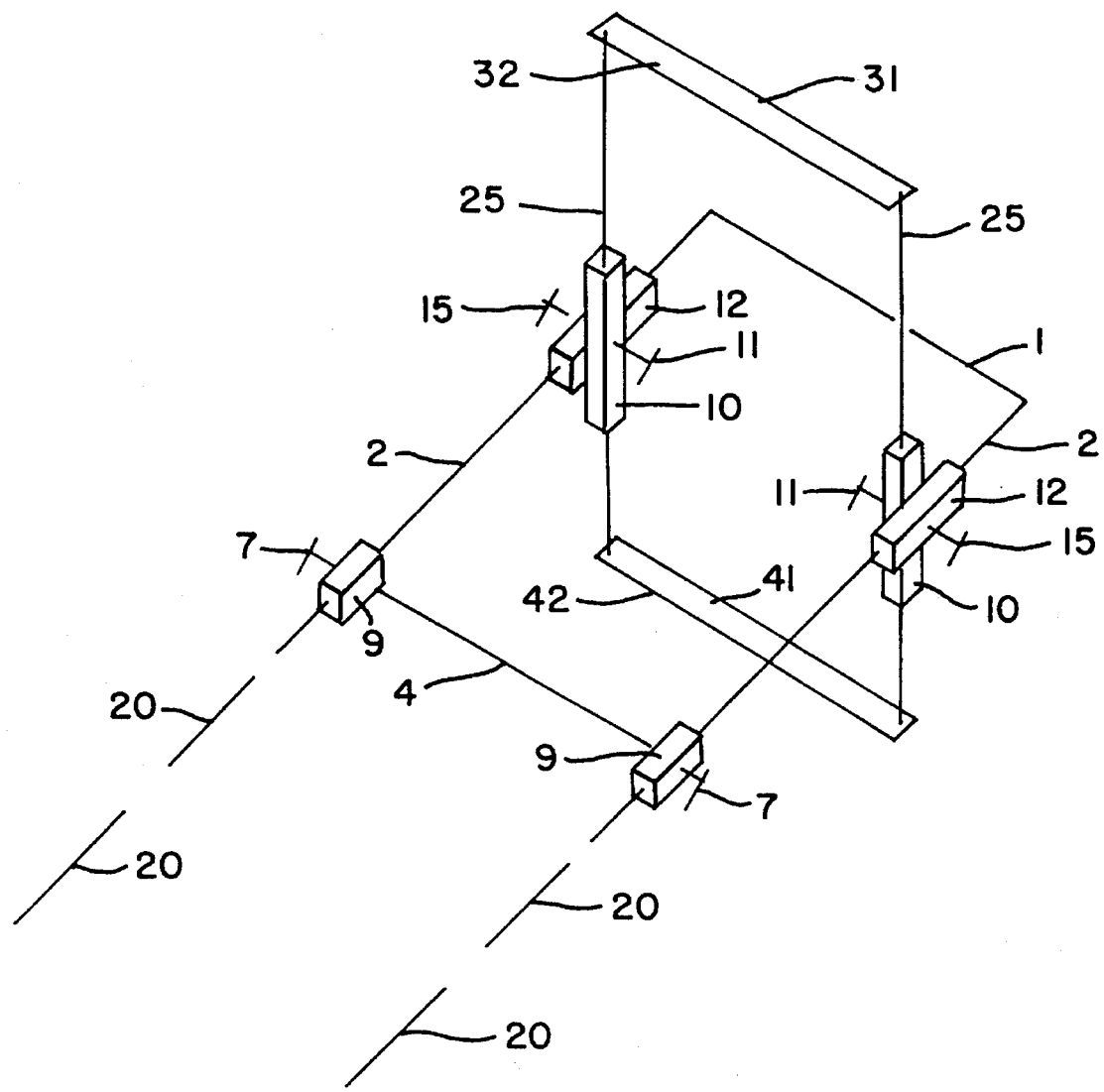
FIG. 5 is a perspective outline sketch, (limited for clarity), showing only the significant parts of the two main frames.

The horizontal frame (FIG. 5) is made up of a front bar 4 and a back bar 1, and two side bars 2. The back bar 1 is permanently attached at right angles to the far ends of bars 2. Bar 1 (FIG. 2) supports two sleeve type carriers 3 that are slideable laterally on this bar. Attached to these carriers are two horizontal rollers 5, and two hardened friction plates 6. Also attached on bar 1 is a plate 73 that supports two L-shaped threaded rods 76 that are designed to clamp the horizontal frame to the workpiece as shown on FIG. 4. Front bar 4 is attached to sleeve 9 which allows it to be slideable on bars 2. It can be locked in the desired location on bars 2 by engaging thumb screws 7. Front bar 4 (FIG. 3) is tapped to accommodate screw 21; this screw along with ball joint 77, plate 74 and friction plate 6, are attached and function as a unit. Plate 73 supports two more threaded rods 76 similar in design and purpose as rods 76 on the back bar 1. Also located on front bar 4 are two sleeves 17 that are slideable laterally. Affixed to these sleeves are two horizontal rollers 18 and two vertical rollers 19.

The side bars 2 (FIG. 2) have measuring tapes 8 affixed to the top sides, and have holes drilled in the exterior vertical sides so as to accommodate thumb screw 7. The near ends of bars 2 are tapped to accommodate the threaded studs on the front ends of bar extenders 20. The opposite ends of bars 20 are tapped so additional extenders may be added.

The vertical frame (FIG. 5) has two vertical bars 25 separated by and connected at right angles to the two upper horizontal bars 31 and 32; and to the two lower horizontal bars 41 and 42. This arrangement makes a rigid rectangular frame.

Figure 1:
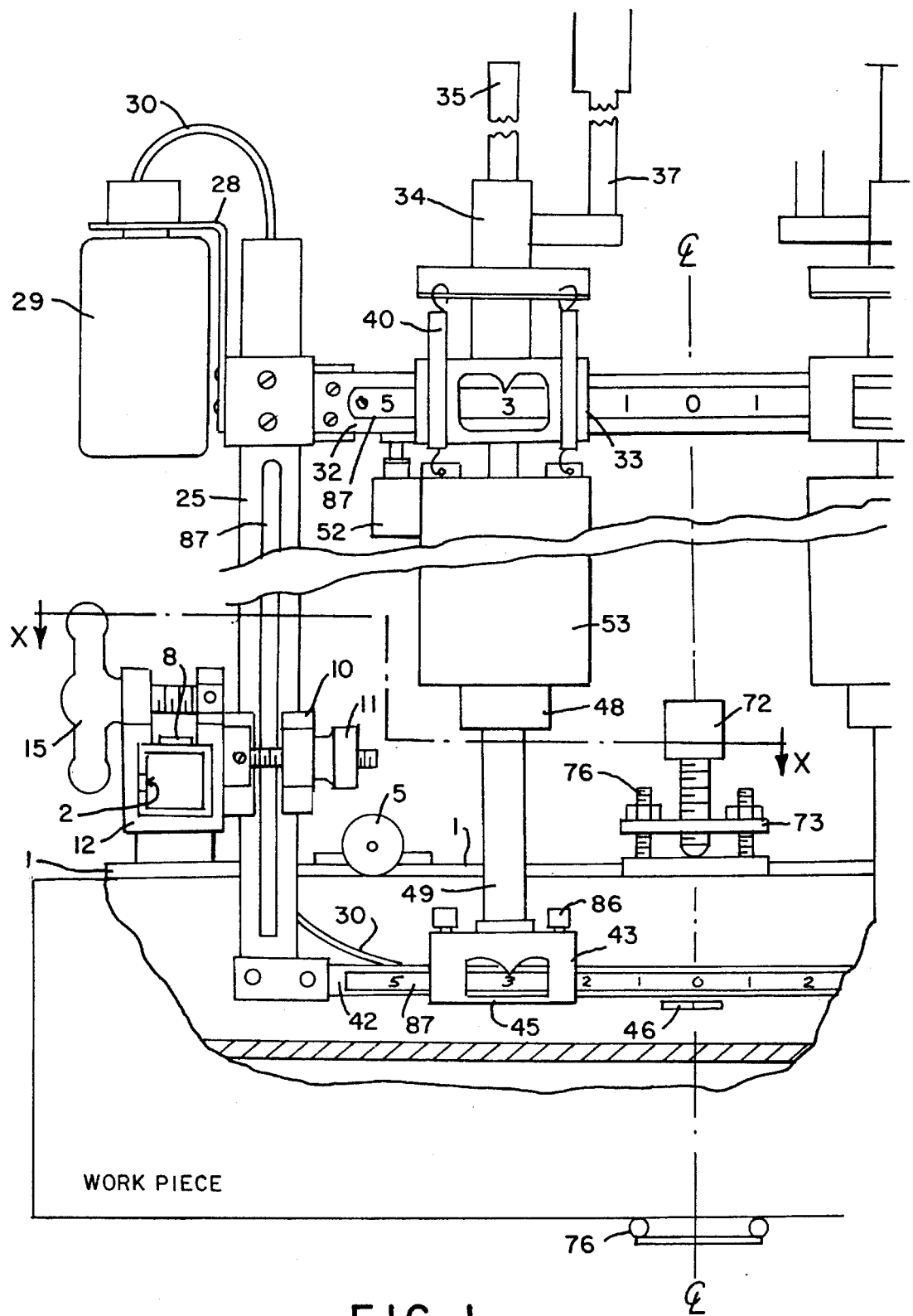
FIG. 1 is an abbreviated elevation of the apparatus positioned to locate and drill holes in the web of a wide flange beam.

Sleeves 10 and 12 (FIGS. 1 & 2) are friction type sleeves permanently fastened together. Sleeve 10 is positioned vertically and 12 horizontally. These sleeves are used to join the horizontal frame to the vertical frame. Sleeve 10 allows the vertical frame to be raised or lowered, then clamped by tightening thumb screws 11. Sleeve 12 acts as the carrier of the vertical frame and is slideable along bars 2. It is clamped at the desired location by tightening knobs 15. The upper horizontal bars 31 and 32 (FIGS. 1–3) of the vertical frame support two sleeves 33 that are slideable laterally. These sleeves are attached to gear housing 34 which supports pinion gears 36, gear rack 35, tension springs 40, and levers 37. The bottom ends of gear rack 35 and tension springs 40 are attached to the top of drilling tools 53. These tools are equipped with always ON switches 52 and adapters 48 that hold the annular drill bits 49. The bottom bars 41 and 42 support two drill bushing housings 43 that are slideable laterally. These bars are drilled and tapped to accommodate thumb screws 86 that locks housings 43 at desired locations. Housing 43 carries the hardened drill bushing 44 and pointers 45. Pointer 46 is permanently fastened at the center line of bar 42. Sleeve 13 (FIG. 2) is a clamp that supports the self-winding measuring tape 14; it is slideable on the right hand bar 2, and allows the tape to be raised, lowered, and clamped in a desired position. A tape 87 is affixed to the vertical face of bars 25, 32, and 42 (FIG. 1). Bracket 28 supports the plastic coolant bottle 29 and hose line 30.

Without changing the basic design or concept of the apparatus, it can be readily altered to suit the user's particular needs. It can be furnished with only one drilling tool which would make it lighter and less expensive. Various drill bit types, diameters, lengths, chucks, and motors can be accommodated.

NOMENCLATURE

Before placing the apparatus on the workpiece, the operator will position the front bar 4 (FIG. 2) so the vertical rollers 19 thereon are about one inch away from the nearest vertical surface of the workpiece. The apparatus should then be placed so that the horizontal rollers 5 and 18 are resting on the highest horizontal surfaces of the workpiece. The entire weight of the apparatus is always carried on these rollers. To provide drill chip clearance, the bottom side of drill bushing housing 43 (FIG. 1 & 3) should be located about three quarters of an inch above the surface to be drilled. This is accomplished by raising or lowering the vertical frame (FIG. 1) and then retightening screws 11. Drill bushing housings 43 and sleeves 33 must be located laterally to agree with the gauge specified on the detail drawings. Housings 43 can be locked in place by engaging thumb screws 86 (FIG. 1).

Thumb screws 72 (FIG. 2&3) are used to adjust rods 76 so the horizontal legs of the rods are slightly lower than the lowest horizontal surface of the workpiece. The apparatus can now be pushed forward in the direction of the Y—Y axis of the workpiece until vertical rollers 19 are touching the said near vertical surface of the workpiece.

Figure 2:
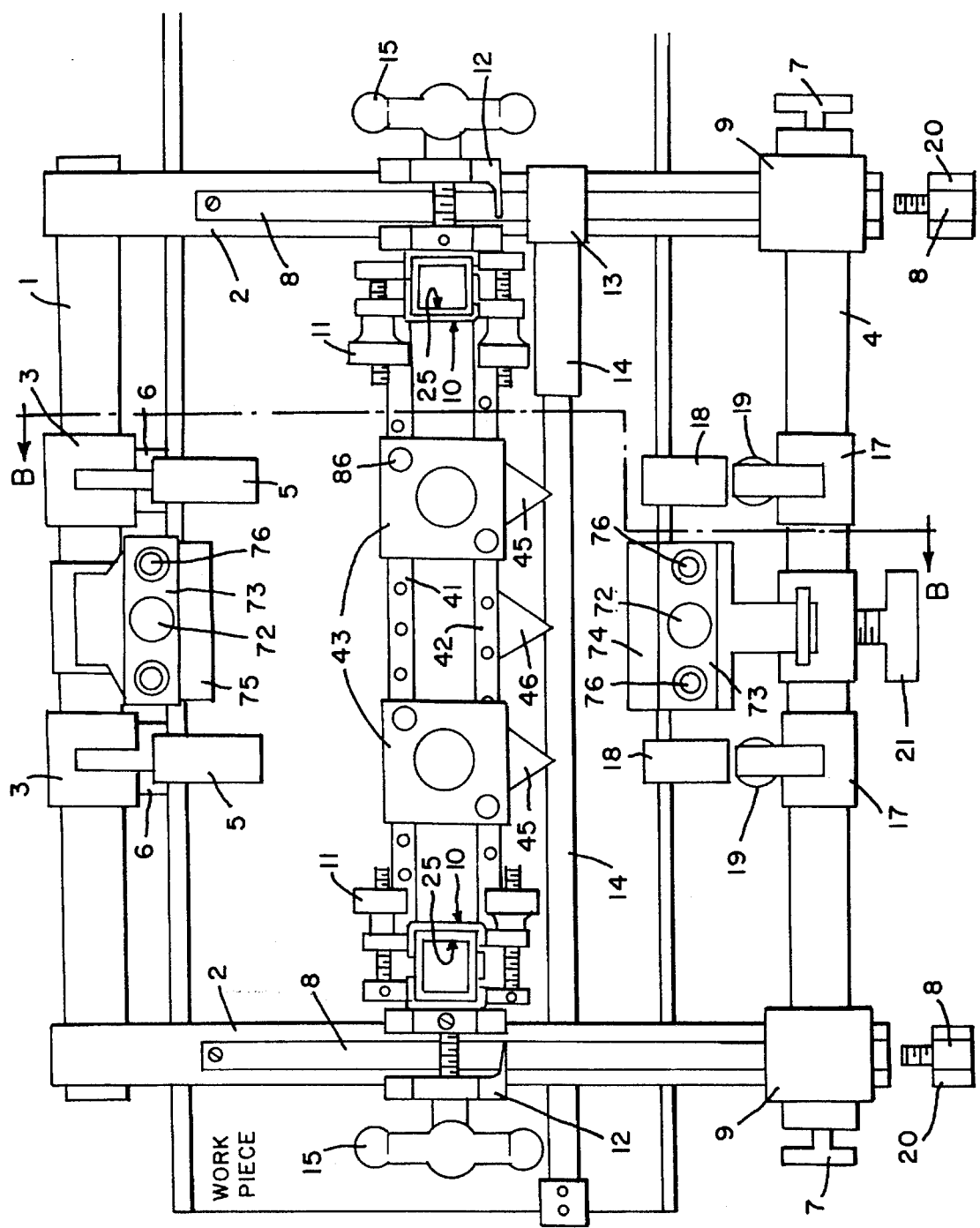
FIG. 2 is a sectional X—X plan view of FIG. 1.

The apparatus can then be rolled along the X—X axis of the workpiece in the direction of the location of the first holes nearest the left hand end of the workpiece. The clip end of measuring tape 14 (FIG. 2) is then attached to the left end of the workpiece. It will remain there until all the holes are drilled and the apparatus is ready to be removed. The apparatus is then rolled so pointers 45 and 46 are at the same location on tape 14 as is specified on the detailed drawings (FIG. 2). Screw 21 is then tightened. This tightening action (FIG. 3) creates a vise like grip on the workpiece. It also places the horizontal legs of all vertical rods 76 under the lowest horizontal surface of the workpiece. Thumb screws 72 are then made finger tight so the horizontal legs of rods 76 are in contact with lowest horizontal surface of the workpiece. The apparatus is now firmly clamped to the workpiece in both the horizontal and vertical directions, and is located on the X—X axis as specified on the shop drawings. The specified hole locations in the direction of the Y—Y axis of the workpiece are obtained by an easy push or pull motion on loosened knobs 15 (FIG. 1 & 2). This action will slide the vertical frame along bars 2 and its position thereon will be indicated on tape 8. When the specified dimension is reached, knobs 15 are retightened. This procedure will again be followed for subsequent holes in this direction.

To start the drilling operations, the operator gives the plastic bottle 29 (FIG. 1) a gentle squeeze which sends a stream of liquid lubricant via tube 30 to the spot about to be drilled. He then pulls one or both levers 37. This motion will activate switch 52 which will in turn start the drill motors 53; and feed drill bit 49 into the workpiece. Additional liquid is provided as needed. After the holes are drilled and all pressure on levers 37 is removed, springs 40 will return the drills 53 to an at rest position and push switch 52 to the OFF position. About one eighth of an inch of drill bit 49 will always remain in drill bushing 44 so as to provide for easy entrance to the same.

Thumb screws 72 are now given about one turn so the horizontal legs of rods 76 are below the lowest horizontal surfaces of the workpiece. Screw 21 is also loosened or backed off, and the apparatus is again pushed forward. All motions previously outlined in regard to the first line or set of holes is repeated until all the holes on this surface are drilled.

Thumb screws 72 and screw 21 are again loosened, the apparatus is pushed forward and then rolled back to the starting point; and lifted off the workpiece. If the next piece to be drilled is the same as the previous piece, no adjustment to the apparatus will be necessary. The length of a piece or the location of the holes in it will generally not require any adjustments. If this is not the case, adjustments as previously outlined may be necessary. It is, therefore, apparent that there has been provided in accordance with the present invention, a portable drilling apparatus that fully satisfies the aims and advantages hereinbefore set forth. While this invention has been described in conjunction with the specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A portable apparatus for drilling holes in a workpiece, comprising:

a first frame member comprising a substantially rectangular frame comprising a first elongated element, a second elongated element attached at a first end of said first element at a substantially right angle thereto, a third elongated element attached at a second end of said first element at a substantially right angle thereto so that said second and third elements are parallel to each other, and a fourth elongated element slidably mounted on said second element and said third element so that said fourth element is parallel to said first element;

a second frame member slidably attached to and substantially perpendicular to said first frame member;

a plurality of rollers attached to said first frame member and positioned so that said first frame member is movably supported on the workpiece;

a first clamping device to secure said first frame member to the workpiece at a desired location;

a second clamping device to secure said second frame member to said first frame member at a desired location; and a drill mounted on said second frame member.

2. An apparatus according to claim 1, further comprising two sleeves for moving said fourth element along said second and said third elements to vary the distance between said fourth element and said first element.

3. An apparatus according to claim 2, wherein said second frame comprises:

a first vertical element slidably attached to said second elongated element;

a second vertical element slidably attached to said third elongated element, said second vertical element being substantially parallel to said first vertical element;

a beam member connecting said first vertical element and said second vertical element.

4. An apparatus according to claim 3, wherein said drill is mounted on said beam member.

5. An apparatus according to claim 3, wherein said first clamping device comprises:
- a friction block attached to said first elongated member; and
- a screw mounted in said fourth elongated member and extending therethrough in a substantially perpendicular direction so that when the apparatus is placed on the workpiece tightening of said screw causes the workpiece to be clamped between said screw and said friction block.

6. An apparatus according to claim 1, further comprising a lubricating device mounted on said second frame member so as to provide lubrication to a drill bit cutting the workpiece.

* * * * *